March 22, 1955 J. N. WILTSIE ET AL 2,704,672
INDEXABLE COLLET CHUCK APPARATUS
Filed Oct. 13, 1952 3 Sheets-Sheet 1

INVENTORS
J.N.Wiltsie & K.G.Hopkins
BY Roy A. Plant
ATTORNEY

March 22, 1955   J. N. WILTSIE ET AL   2,704,672
INDEXABLE COLLET CHUCK APPARATUS
Filed Oct. 13, 1952   3 Sheets-Sheet 2

INVENTORS
J.N.Wiltsie & K.G. Hopkins
BY Roy A. Plant
ATTORNEY

United States Patent Office 2,704,672
Patented Mar. 22, 1955

2,704,672

INDEXABLE COLLET CHUCK APPARATUS

James N. Wiltsie and Kenneth G. Hopkins, Jackson, Mich., assignors to G & Z Automatic Products Company, Jackson, Mich., a corporation of Michigan Application October 13, 1952, Serial No. 314,478

19 Claims. (Cl. 279—5)

The present invention relates broadly to workpiece holding apparatus, and in its specific phases to an indexing collet chuck assembly and means for actuating same.

Collet chuck assemblies commercially in use prior to the one set forth in the U. S. Patent No. 2,621,938, granted December 16, 1952, to Irvin J. Ziegler, and of which the present invention is an improvement, were universally of the rising collet type. That type of collet chuck apparatus is subject to the limitation that even a relatively small variation in the diameter of the part to be gripped and held by the collet for machining will vary the height of the top of the collet in the gripping position, which in turn makes it difficult to hold lengthwise dimensions to close tolerances for the part being machined. Moreover the more commonly used collet chuck assemblies only have moderate holding power on the part to be machined and that limits them so far as severe types of machining is concerned. All types of collet chuck assemblies commercially in use at the time the Ziegler non-rising collet chuck assembly came onto the market, also lose their grip on the part being machined the moment that the applied gripping pressure is released and even before collet opening pressure is applied. The need of indexing collet chuck assemblies for accurately machining a part in various positions became obvious some time ago but the limitations of rising collet chucks, the moderate holding power of most assemblies of this type, and the difficulty or substantial impossibility of indexing them without releasing at least part of the gripping pressure, with resultant danger of the part shifting, are inherent in the commercially attempted solutions of this problem. It was a full recognition of this problem and of the shortcomings and difficulties of the prior art in the indexing collet chuck assembly field, as now commercially in use, which led to the conception and development of the present invention.

Accordingly among the objects of the present invention is the provision of a highly efficient indexing collet chuck assembly.

Another object is to provide a collet chuck assembly which is a modified form of the Ziegler non-rising collet type, and yet which is readily indexed.

Another object is to provide an indexing non-rising collet chuck assembly wherein the gripping pressure of the collet on the part being held for machining does not have to be reduced to facilitate indexing.

Another object is to provide a non-rising collect actuated through a multiple construction sleeve having a portion restricted to endwise movement, and yet allowing said collet and another portion of said sleeve to be readily turned in unison in prescribed substantially exact amounts for indexing while subjected to full collet gripping pressure.

Another object is to provide an indexing collet chuck assembly having a non-rising collet and a multiple construction actuating sleeve which is movable bodily endwise of said collet for actuating same, and wherein one portion of said multiple construction sleeve is limited solely to said endwise movement while a second portion of said sleeve is additionally rotatable in unison with said collet for indexing same.

A further object is to provide an indexing collet chuck assembly having a non-rising collet, and a multiple construction actuating sleeve, wherein one portion of said sleeve is limited to endwise movement, with said sleeve portion having external circumferential threads engaged by an annular nut which is held against endwise movement but rotatable for moving said multiple construction actuating sleeve in reversible endwise direction.

A further object is to provide a toothed annular nut which is adapted for threaded engagement with and endwise movement of the collet actuating multiple construction sleeve, and to further provide a pivotally mounted toothed means which has a portion meshing with the teeth on said annular nut, and with another portion meshing with a rack which is actuated by any suitable operating mechanism.

A further object is to provide a sleeve for actuating a non-rising collet through movement lengthwise thereof and wherein said actuating sleeve has a portion limited to lengthwise movement, and a second portion in contact with the upper portion of said collet adapted for simultaneous lengthwise movement with said first portion and also rotary movement relative to same but in angular unison with said collet, said first and second portions of said sleeve being separated by means of a bearing.

A further object is to provide a non-rising collet chuck assembly wherein the lower end of the collet is supported against rising by means of a connecting member and bearing, an endwise movable multiple construction actuating sleeve for said collet, one portion of said sleeve being limited to lengthwise movement while a second portion, in operating contact with the upper portion of said collet, is adapted for simultaneous lengthwise movement with said first portion and also rotary movement relative to same but in angular unison with said collet, said first and second portions of said sleeve being separated by means of a bearing, said collet being supported by said two bearings which facilitate rotation of same while subjected to full gripping pressure.

A further object is to provide a collet chuck assembly with a non-rising collet and an endwise movable multiple construction actuating sleeve for said collet, one portion of said sleeve being limited to lengthwise movement while a second portion of same, which is in operating contact with the upper portion of said collet and keyed thereto, is adapted for simultaneous lengthwise movement with said first portion and also rotary movement relative to same but in angular unison with said collet, and a latching mechanism for said second portion, which in turn has an operating handle, a latch disengaging portion, and a ratchet mechanism operably connected thereto for use in prescribed angular indexing of said collet.

A further object is to provide an indexing collet chuck assembly of the non-rising collet type with endwise movable multiple construction operating sleeve, which assembly may be mounted in any position and is adapted for various machining operations such as turning, boring, cross drilling, and milling.

A further object is to provide an indexing collet chuck assembly of the type described which is relatively simple in construction, easily manufactured to close tolerances, and is accurate and easy to use.

Still further objects and advantages of the present invention will appear as the description proceeds.

To the accomplishment of the foregoing and related ends, the invention, then, consists of the collet mounting and actuating means hereinafter fully described and particularly pointed out in the claims, the annexed drawings and the following description setting forth in detail certain means for carrying out the invention, such disclosed means illustrating, however, but one of various ways in which the principle of the invention may be used.

Figure 1:
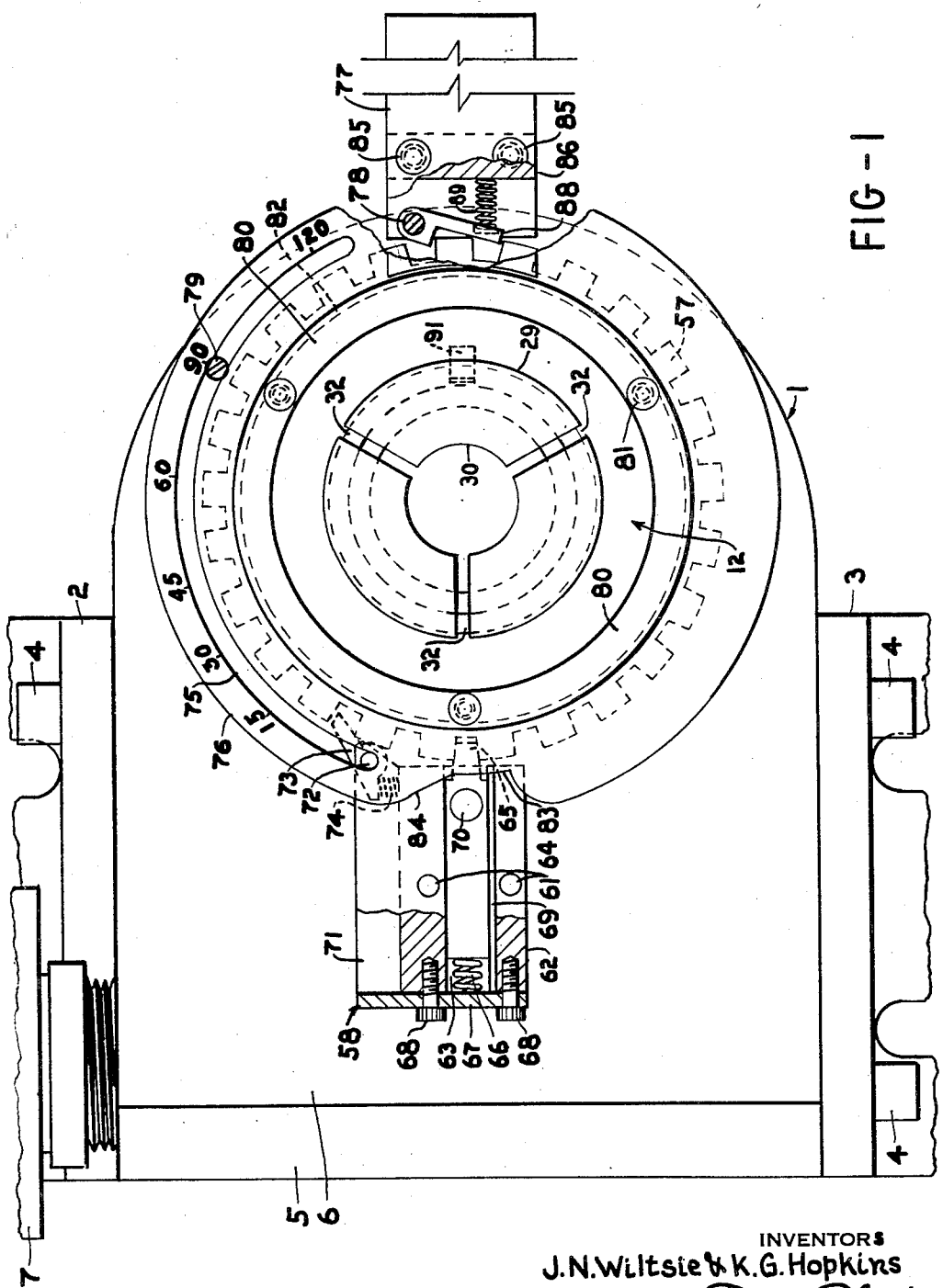
Figure 1 shows a top assembly view, partially in section, and with some parts broken away for ease of illustrating a prefered form of the present indexing collet chuck assembly.

Referring more particularly to the drawings, it will be noted that the indexing collet chuck assembly 1 is mounted on a pair of bracket members 2 and 3 by means of cap screws 4. The housing or body portion of this collet chuck assembly consists of a bottom member 5 and a top member 6. Mounted on the bottom member for actuating the collet chuck assembly is any suitable source of actuating force such as a double acting air cylinder assembly 7 fragmentarily shown in Figures 1 and 2.

Figure 3:
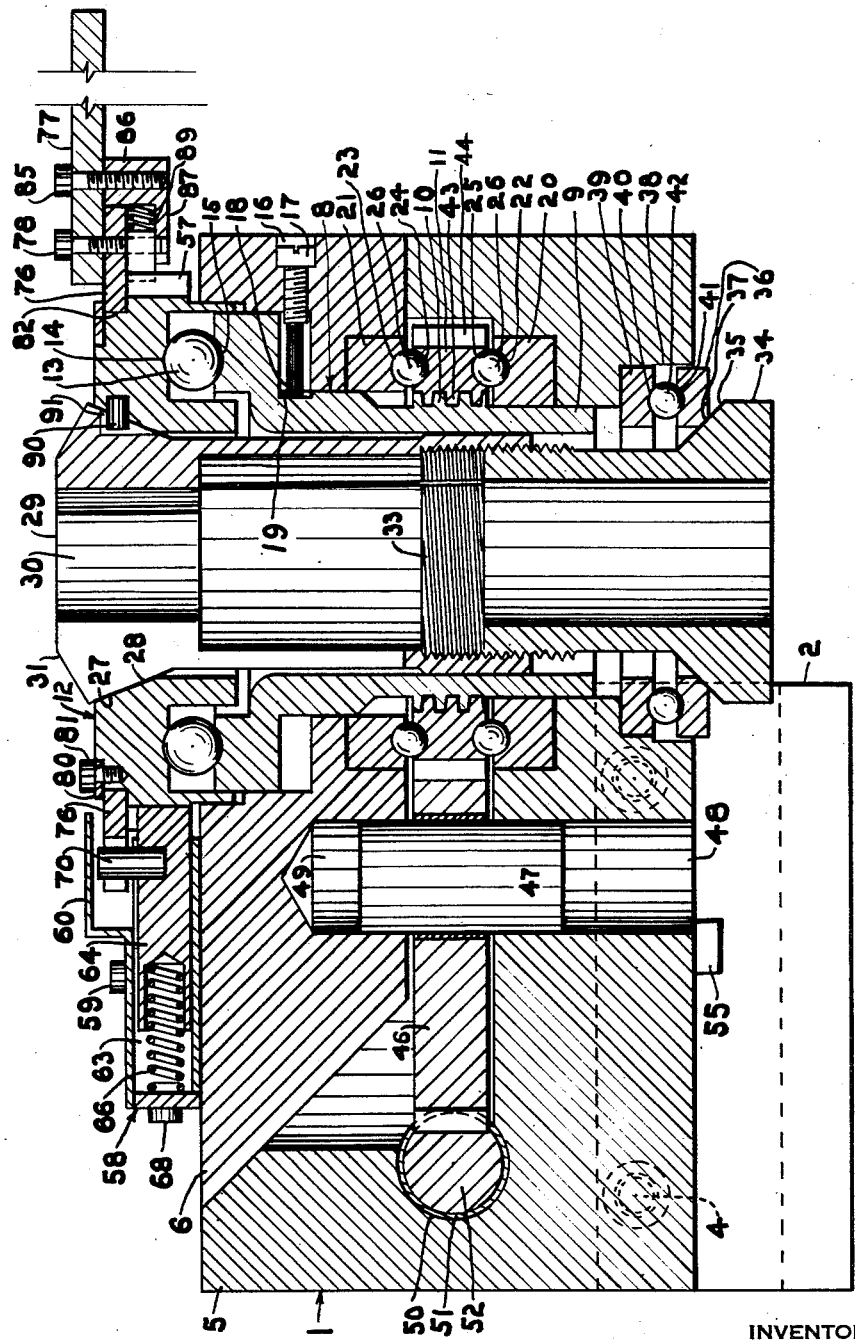
Figure 3 shows a vertical center section of the assembly shown in top view in Figure 1.

Bottom member 5 and top member 6, Figure 3, are concentrically bored in alinement for the reception of a multiple construction sleeve 8 which has a lower sleeve portion 9 provided with threads 10 which are preferably of the double acme type adapted to threadedly engage a ring nut 11. The upper sleeve portion 12 of multiple construction sleeve 8 is mounted above lower sleeve portion 9 and carried on ball bearings 13 with the adjacent faces of said upper sleeve portion 12 and lower sleeve portion 9 provided with alined ball race grooves 14 and 15 in which the ball bearings 13 are adapted to roll when the apparatus is indexed as will be hereinafter explained.

Top member 6, Figure 3, is provided with a drilled and threaded opening 16 adapted to receive a cap screw 17, the point 18 of which is preferably unthreaded and of cylindrical form adapted to fit into a slot 19, preferably vertical, in lower sleeve portion 9 wherein said slot is substantially of the same width as point 18 of cap screw 17 which fits thereinto. This slot 19 in cooperation with point 18 of cap screw 17 thus limits lower sleeve portion 9 to endwise movement.

The bottom member 5, Figure 3, of collet chuck assembly 1 is counterbored concentrically with said bore for said lower sleeve portion 9 for the reception of a ball race 20 in its upper face, while the top member 6 of the collet chuck assembly is likewise concentrically counterbored in its lower face for a ball race 21. The upper face of ball race 20 is provided with a groove 22 and the lower face of ball race 21 is provided with a groove 23 with said grooves, respectively, being in alinement with lower and upper grooves 25 and 24 in ring nut 11 for the reception therein of ball bearings 26 which facilitate the rotation of ring nut 11 under conditions of operation which will be hereinafter described.

The upper sleeve portion 12 has a central passageway therethrough substantially of the same size as a like central passageway through the lower sleeve portion 9 of the multiple construction sleeve 8. The upper end of this central passageway of the upper sleeve portion 12 is provided with a moderate upward and outward tapered portion 27 substantially corresponding with the outwardly tapered upper portion 28 of collet 29. This collet is of an outer diameter at its lower end which forms a close but free sliding fit on the inner diameter of the opening through lower sleeve portion 9. Collet 29 is provided at its upper end with an axial bore 30 which leaves a rather heavy walled head portion 31 for gripping a workpiece (not shown) to be held for machining under conditions of use of the present apparatus. Directly below this head portion 31 the axial bore 30 is enlarged so that the collet 29, which is preferably provided with three longitudinal slits 32, Figure 1, which extend substantially down to the internal threads 33, Figure 3, will be sufficiently flexible for contraction and expansion of the upper end of the collet under conditions of use.

A tubular member 34, Figure 3, is provided with external threads at its upper end adapted to engage the internal threads 33 on the lower portion of collet 29, and be fastened in fixed position thereto in any conventional manner, while its lower end is enlarged and preferably provided with an outwardly and downwardly extending tapered surface 35. Mounted on and engaging this tapered surface is a ball race 36 which likewise may be provided with a correspondingly tapered edge 37. The bottom member 5 of the collet chuck assembly is provided at its bottom with a counterbore 38 concentric with the bore into which lower sleeve portion 9 slidably fits. Fitting into the upper end of this counterbore 38 is a ball race 39, with the latter having a groove 40 in its lower face in alinement with groove 41 in the upper face of ball race 36, which rotatably fits in counterbore 38. Ball bearings 42 fit in these two ball race grooves and with sleeve 34 tightened to grip the tapered face 28 of collet 29 against the tapered face 27 of the upper portion of multiple construction sleeve 8, these ball bearings 42 act as an anti-friction support to prevent the rising of collet 29 under conditions of operation.

Ring nut 11 is provided on its inner face with threads 43, Figure 3, operatively meshing with external threads 10 on the lower sleeve portion 9, so that rotation of ring nut 11 will correspondingly move lower sleeve portion 9 in endwise direction. On the outer face of ring nut 11, same is provided with gear teeth 44, Figure 2, adapted to mesh with corresponding gear teeth 45 in the smaller pitch diameter of double segmental gear 46. This double segmental gear is mounted on a pivot pin 47 fitting a suitable bore 48, Figure 3, in bottom member 5, and with that bore preferably being extended to form alined bore 49 in top member 6 of the housing so that pivot pin 47 will be fully supported both at its top and bottom and thus provide a better support for double segmental gear 46 in its rotary movement thereon. A double segmental gear is preferably used where extra leverage and collet gripping power is desired, although a plain gear can be used where a lower operating pressure is satisfactory, and it is intended that the showing be considered as diagrammatically illustrating these various constructions.

Figure 2:
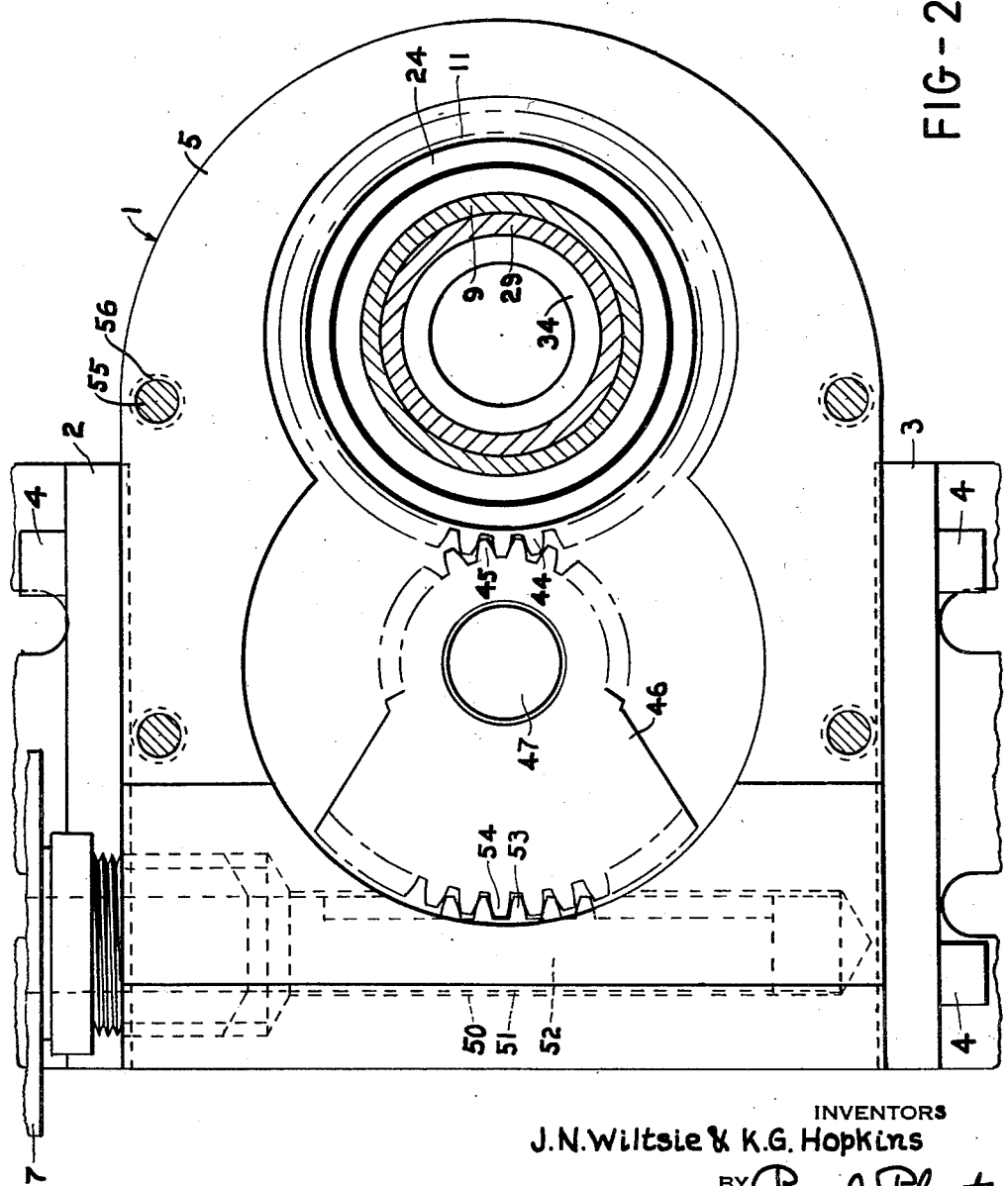
Figure 2 shows a top view of the assembly illustrated in Figure 1 but with the upper members removed and the collet and operating sleeve sectioned substantially at the top of the internally threaded annular nut.

Bottom member 5 of the collet chuck assembly is provided with a cross bore 50, Figures 2 and 3, into which is preferably fitted a bearing sleeve 51. A rack 52 carrying teeth 53 on one edge and adapted to mesh with teeth 54 on the large pitch diameter of double segmental gear 46 forms an extending portion of the piston rod of double acting air cylinder 7. In Figure 3 for convenience of showing the double segmental gear 46 in operating position, extra clearance has been shown between its upper and lower faces although in actual construction same would preferably be of a size forming a close but free fit between the upper and lower portions of the housing assembly. Those upper and lower members of the housing may be fastened together in conventional manner with studs 55, Figure 2, extending up through openings 56 in bottom member 5 and threadedly engaging alined openings (not shown) in top member 6.

To actuate the collet 29 for its gripping and releasing of a part to be machined, the rack 52 is first moved to its uppermost position as seen in Figure 2, which in turn rotates segmental gear 46 in clockwise direction and at the same time turns ring nut 11 in anticlockwise direction which, through its engagement with the threads 10 on lower sleeve member 9 of the multiple construction sleeve 8, moves said lower sleeve member 9 in downward direction and through the cooperation of the tapered surfaces 27 and 28 of the upper sleeve portion 12 and collet respectively, the outward expansion force of collet head portion 31 forces upper sleeve portion 12 downward and allows the head portion 31 of the collet 29 to expand to workpiece receiving position. After the workpiece (not shown) is in place in the axial bore 30 of the collet 29, movement of the rack 52 in a downward direction, as seen in Figure 2, will rotate double segmental gear 46 in anticlockwise direction, and through its engagement with the teeth on ring nut 11 will rotate the latter in clockwise direction. Rotation of ring nut 11 in this direction, through its engagement with the threads 10 on lower sleeve portion 9 of multiple construction sleeve 8 will move the latter as a whole to push upper sleeve portion 12 of same in an upward direction so that its tapered face portion 27 in engagement with the outer tapered face portion 28 of the collet 29 will shrink the size of bore 30 in head portion 31 of the collet so as to grip the appropriate sized workpiece to be held by the assembly. At the end of the machining operation, air is again admitted in conventional manner into double acting cylinder 7 so that rack 52 will be moved in reverse direction which allows the collet 29 to expand and to release the workpiece for removal, and thus leave the collet chuck assembly ready for operation on the next piece to be machined.

The above description explains the actuation of the apparatus so far as mere gripping and releasing of a workpiece is concerned. The present apparatus, however, has further capabilities in that said collet, while of the non-rising type, is also indexable to provide for machining of the workpiece in different rotated positions by taking advantage of the multiple construction sleeve 8 which has been described and of which the upper portion may be rotated in addition to movement in unison with the lower portion 9 which is limited to endwise movement due to the cooperative engagement of the point 18 of cap screw 17 in slot 19 of the lower sleeve portion as has been previously described.

Referring more particularly to Figures 1 and 3, it will be noted that the upper sleeve portion 12 is provided on its outer surface with a series of radial teeth 57, for instance twenty four teeth, which permit indexing in 15° units and which meet most indexing requirements. The invention, however, is not limited to the use of 24 teeth since other numbers can be used, for example 72 teeth for 5° indexing. In order to hold the upper sleeve portion in various fixed rotative positions a latching assembly 58 is provided with same anchored in place on the top of top member 6 of the housing by means of a pair of set screws 59 which pass through suitable openings in shield member 60 and through openings 61 in body member 62 of the latching assembly. This body member 62 is provided with a channel 63 in which is fitted a latch 64 having an engaging end 65 the sides of which preferably taper to a somewhat smaller point so that the sides of same will engage the sides of the spaces between radial teeth 57 to rigidly hold the upper sleeve portion in fixed position when the latch 64 is fully engaged. This latch is preferably counterbored at its rear end for a short distance for the reception of the end of a compression spring 66 which is supported at its rear end by means of end plate 67 anchored to body member 62 by means of a pair of set screws 68. If desired a spacer member 69 for adjustment and taking up wear and the like at the sides of latch 64, may be provided. Extending upward from the end of latch 64 adjacent the engaging end 65 is a latch operating pin 70, the use of which will be hereinafter described.

As viewed in Figure 1, body member 62 of the latching assembly 58 has a side slot 71 and in that slot is pivotally mounted on pivot pin 72 a latching dog 73 which is urged into latching position by a small compression spring 74. This latching dog is engageable with radial teeth 57 on upper sleeve portion 12 to substantially prevent anticlockwise rotation of upper sleeve portion 12 during the anticlockwise rotation of indexing ring 76 to which is connected operating handle 77 by means of cap screws 78, Figure 3. The pivot pin 72 on which latching dog 73 is mounted extends above body member 62 and fits into slot 75 of the indexing ring 76 where it acts as a stop at one end of said slot. Mounted in this slot 75 and anchorable at various positions therein is an adjustable stop member 79. This adjustable stop determines, from its location, the maximum distance which indexing ring 76 may be rotated in anticlockwise direction, and this determines the angular distance through which collet 29 is rotated when indexing ring 76 is first moved anticlockwise by means of operating handle 77 from the position shown in Figure 1 until adjustable stop 79 comes up against pivot pin 72, following which the indexing ring 76 is then moved clockwise until the end of slot 75 comes up against pivot pin 72 once more. The rotation or indexing of collet 29 takes place during this clockwise movement of the indexing ring 76.

In accomplishing this indexing movement there are several mechanisms involved, but first it should be noted that ring 80 is anchored to the top of upper sleeve portion 12 by means of set screws 81 and that this ring in turn holds indexing ring 76 slidably in position on upper sleeve portion 12 which in turn is provided with a circumferential notch 82 on its upper edge in which the indexing ring 76 closely but slidably fits. Indexing ring 76, Figure 1, is provided with an edge recess 83 having a cam face 84 adapted to engage latch operating pin 70 when indexing ring 76 is moved in anticlockwise direction from the position shown. The engagement of this cam with pin 70 moves latch 64 to the left and withdraws the engaging end 65 of that latch out of engagement with the space between two of the radial teeth 57 on the outer edge of upper sleeve portion 12, and thus leaves same free for indexing rotation.

Mounted on handle 77, Figure 3, by means of a pair of cap screws 85, is a downwardly extending bracket member 86 having an inturned flange 87 on which is pivotally mounted a latching dog 88, Figure 1, with one of said cap screws 78 acting as the pivot mounting for same. A compression spring 89 resiliently holds latching dog 88 in latching position for engaging radial teeth 57 in the outer periphery of upper sleeve portion 12 when indexing ring 76 is moved in clockwise direction. This latching dog 88 merely ratchets when indexing ring 76 is moved in anticlockwise direction.

In order that collet 29 will rotate in unison with upper sleeve portion 12, a pin 90 is mounted radially of upper sleeve portion 12 and projetcs into the open central space of same, preferably out of the tapered portion 27 thereof, into a groove 91 of collet 29 with such groove being of a width closely fitting the diameter of pin 90. Movement of multiple construction sleeve 8 in up and down direction will thus carry pin 90 up and down in groove 91 while holding upper sleeve portion 12 and collet 29 substantially free from rotation relative to each other.

The indexing of the collet 29 in accordance with the present invention is accomplished as follows: If the collet, for instance, is to be indexed 90° from its starting position, which is typically shown in Figure 1, adjustable stop member 79 will be moved to and tightened in position in slot 75 of indexing ring 76 at the 90° index marking. Then by grasping handle 77, which is rigidly attached to indexing ring 76, and moving same in an anticlockwise direction, latching dog 88 will merely ratchet on radial teeth 57 during such movement. Latching dog 73 at the same time will hold upper sleeve portion 12 from moving in an anticlockwise direction. Cam face 84 of indexing ring 76, during this movement, will engage latch operating pin 70 and move same to the left and with it carry latch 64 and disengage its engaging end 65 from the space between a pair of radial teeth 57 on upper sleeve portion 12. The anticlockwise movement of indexing ring 76 is then continued until adjustable stop member 79 comes up against pivot pin 72 which projects upward into slot 75 of the indexing ring (or without this stop member, watching indexing ring until the 90° marking coincides with pivot pin 72 will accomplish the same result). Then by applying clockwise turning force on operating handle 77, latching dog 88 will engage the side of one of the radial teeth 57 of upper sleeve portion 12 and cause that sleeve, and with it collet 29, due to the interconnection of the two through pin 90 and groove 91, to rotate in unison. During the starting portion of this clockwise movement of the indexing ring, latch operating pin 70 will slide on the outer face of same and such sliding will continue with latching dog 73 ratcheting. When latch operating pin 70 reaches cam face 84 and starts moving down same due to the force exerted by compression spring 66, latch 64 with its engaging end 65, on which said latch operating pin 70 is mounted, will move inward so that when lever 77 is at the end of its travel in clockwise direction, with the end of slot 75 up against pivot pin 72, the engaging end 65 of latch 64 will have entered the space between a pair of radial teeth 57 and will have come to rest in contact with the adjacent sides of same to accurately locate upper member 12 and collet 29 in indexed position. It is thus to be seen that with a workpiece (not shown) gripped in the collet ready for standard machining operations, that collet without releasing or reducing its grip on the workpiece can be indexed. At the end of the indexing operations, actuation of the air cylinder 7 in conventional manner to move multiple construction sleeve 8 downward will allow collet 29 to expand and thus release the machined workpiece and place the apparatus in condition for receiving, gripping, and indexing the next workpiece to be operated upon.

From the foregoing, it will be seen that novel features of a highly efficient collet chuck apparatus have been disclosed for attaining the desired ends in the form of an indexable collet chuck apparatus. However, it is to be understood that while for convenience of illustration and description the apparatus has been shown in upright position, it is not limited to such position since it is also operable from other positions. Accordingly, directional terms such as "upper" and "lower," et cetera, are to be considered as relative only and not limiting upon the apparatus disclosed and claimed.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A workpiece holding apparatus, which comprises a housing, an endwise movable sleeve fitting into said housing and having separate upper and lower portions facilitating controlled rotary movement relative to each other, means for guiding and limiting said lower sleeve portion to endwise movements, a collet operably fitting into said sleeve, means for anchoring said collet against endwise movement in said housing, means joining said upper sleeve portion to said collet so that their movements relative to each other are limited to said upper sleeve portion moving endwise of said collet, means for reversibly moving said lower sleeve portion in endwise direction, and means for actuating said collet when said sleeve is moved in endwise direction.

2. A workpiece holding apparatus, which comprises a housing, an endwise movable sleeve fitting into said housing and having separate upper and lower portions, means for guiding and limiting said lower sleeve portion to endwise movements, a collet fitting into said sleeve, means for anchoring said collet against endwise movement in said housing, means joining said upper sleeve portion to said collet so that their movements relative to each other are limited to said upper sleeve portion moving endwise of said collet, means for reversibly moving said sleeve in endwise direction, means for actuating said collet when said sleeve is moved in endwise direction, and a bearing separating said upper and lower portions of said sleeve to facilitate controlled rotary movement of said upper sleeve portion on said lower sleeve portion.

3. A workpiece holding apparatus as set forth in claim 1; wherein said means for anchoring said collet against endwise movement comprises a member fixedly joined to the lower end of said collet with said member being rotatable with said collet and supported by the bottom of said housing against upward movement.

4. A workpiece holding apparatus as set forth in claim 1; wherein said means joining the upper portion of said sleeve to said collet for endwise movement of the former relative to the latter comprises a lengthwise slot in one of said members and a different member projecting from the other member and closely fitting and engaging said slot for movement lengthwise thereof.

5. A workpiece holding apparatus as set forth in claim 1; wherein said means for reversibly moving said lower sleeve portion in endwise direction comprises circumferential threads on the outer face of said lower sleeve portion and an internally threaded nut fitting said threads, means for holding said nut substantially fixed against endwise movement in said housing while leaving same free to be rotated, and means for reversibly rotating said nut.

6. A workpiece holding apparatus as set forth in claim 1; wherein said means for actuating said collet when said lower sleeve portion is moved in endwise direction consists of a downward and inward tapering surface at the top of said upper sleeve portion and a cooperating exterior surface on the upper end of said collet in actuatable relation to said tapered surface.

7. A workpiece holding apparatus as set forth in claim 1; wherein said means for anchoring said collet against endwise movement comprises a member fixedly joined to the lower end of said collet with said member being rotatable with said collet and supported by the bottom of said housing against upward movement, and wherein said means joining the upper portion of said sleeve to said collet for endwise movement of the former on the latter comprises a lengthwise slot in one of said members and a different member projecting from the other member and closely fitting and engaging said slot for movement lengthwise thereof.

8. A workpiece holding apparatus as set forth in claim 1; wherein said means for anchoring said collet against endwise movement comprises a member fixedly joined to the lower end of said collet with said member being rotatable with said collet and supported by the bottom of said housing against upward movement, and wherein said means for actuating said collet when said sleeve is moved in endwise direction consists of a downward and inward tapering surface at the top of said upper sleeve portion and a cooperating exterior surface on the upper end of said collet in actuatable relation to said tapered surface, and further wherein said means for reversibly moving said lower sleeve portion in endwise direction comprises circumferential threads on an outer face of said lower sleeve portion and an internally threaded nut fitting said threads, means for holding said nut substantially fixed against endwise movement in said housing while leaving same free to be rotated, and means for reversibly rotating said nut.

9. A workpiece holding apparatus as set forth in claim 1; wherein said means for anchoring said collet against endwise movement comprises a member fixedly joined to the lower end of said collet with said member being rotatable with said collet and supported by the bottom of said housing against upward movement, and wherein said means joining the upper portion of said sleeve to said collet for endwise movement of the former on the latter comprises a lengthwise slot in one of said members and a different member projecting from the other member and closely fitting and engaging said slot for movement lengthwise thereof, and further wherein said means for actuating said collet when said lower sleeve portion is moved in endwise direction consists of a downward and inward tapering surface at the top of said upper sleeve portion and a cooperating exterior surface on the upper end of said collet in actuatable relation to said tapered surface, and still further wherein said means for reversibly moving said sleeve in endwise direction comprises circumferential threads on an outer face of said lower sleeve portion and an internally threaded nut fitting said threads, means for holding said nut substantially fixed against endwise movement in said housing while leaving same free to be rotated, and means for reversibly rotating said nut.

10. A workpiece holding apparatus, which comprises a housing, an endwise movable sleeve fitting into said housing and having separate upper and lower portions, a bearing between said upper and lower portions of said sleeve to facilitate controlled rotary movement of said upper sleeve portion on said lower sleeve portion, means for guiding and limiting said lower sleeve portion to endwise movements, a collet fitting into said sleeve, a bearing including means joined to said collet with said bearing being supported by said housing in position to substantially prevent upward movement of said collet while facilitating the rotation of same, means for joining said upper sleeve portion to said collet so that their movements relative to each other are limited to said upper sleeve portion moving endwise of said collet, engaging means for releasably anchoring said rotary upper sleeve portion in various rotated positions in said housing, means for rotating said upper sleeve portion when said engaging means is released, means for reversibly moving said sleeve in endwise direction, and means for actuating said collet when said sleeve is moved in endwise direction.

11. A workpiece holding apparatus, which comprises a housing, an endwise movable sleeve fitting into said housing and having separate upper and lower portions, a bearing between said upper and lower portions of said sleeve to facilitate controlled rotary movement of said upper sleeve portion on said lower sleeve portion, means for guiding and limiting said lower sleeve portion to endwise movements, a collet fitting into said sleeve, means for anchoring said collet against endwise movement in said housing, means for joining said upper sleeve portion to said collet so that their movements relative to each other are limited to said upper sleeve portion moving endwise of said collet, operating means in connection with said upper sleeve portion for indexing said collet, means for reversibly moving said sleeve in endwise direction, and means for actuating said collet when said sleeve is moved in endwise direction.

12. A workpiece holding apparatus as set forth in claim 11; wherein said operating means for indexing said collet comprises engageable members on said upper sleeve portion, means for engaging said engageable members and holding said upper sleeve portion in various fixed positions, means for disengaging said engaging means when said collet is to be indexed, and a latching dog connected for movement in unison with said disengaging means, said latching dog moving over said engageable members of said upper sleeve portion so long as said disengaging means is moved in the same direction as that which started said disengagement, and upon reversal of the direction of movement of said disengaging means, and continuation of that movement, said latching dog will engage at least one of said engageable members of said upper sleeve portion and rotate the latter together with the collet connected for rotation therewith, until said disengaging means reaches its initial position, whereupon said engaging means will reengage said engageable members on said upper sleeve portion and hold said sleeve portion and collet in indexed position.

13. A workpiece holding apparatus as set forth in claim 11; wherein said means for joining the upper portion of said sleeve to said collet for endwise movement of the former relative to the latter comprises a lengthwise slot in one of said members and a different member projecting from the other member and closely fitting and engaging said slot for movement lengthwise thereof.

14. A workpiece holding apparatus as set forth in claim 11; wherein said means for reversibly moving said sleeve in endwise direction comprises circumferential threads on the outer face of said lower sleeve portion and an internally threaded nut fitting said threads, means for holding said nut substantially fixed against endwise movement in said housing while leaving same free to be rotated, and means for reversibly rotating said nut.

15. A workpiece holding apparatus as set forth in claim 11; wherein said means for reversibly moving said sleeve in endwise direction comprises circumferential threads on the outer face of said lower sleeve portion and an internally threaded nut fitting said threads, means including ball bearings for holding said nut substantially fixed against endwise movement in said housing while leaving same free to be rotated, gear teeth on the outer face of said nut, a pivotaly mounted means having teeth in mesh with the teeth on said nut, and an operating means for pivotally moving said pivotally mounted means to rotate said internally threaded nut and move said sleeve in endwise direction.

16. A workpiece holding apparatus as set forth in claim 11; wherein said means for actuating said collet when said sleeve is moved in endwise direction consists of a downward and inward tapering surface at the top of said upper sleeve portion and a cooperating exterior surface on the upper end of said collet in actuatable relation to said tapered surface, and wherein said means for reversibly moving said sleeve in endwise direction comprises circumferential threads on the outer face of said lower sleeve portion and an internally threaded nut fitting said threads, means including ball bearings for holding said nut substantially fixed against endwise movement in said housing while leaving same free to be rotated, gear teeth on the outer face of said nut, a pivotally mounted gear means having teeth in mesh with the teeth on said nut, and an operating means for pivotally moving said pivotally mounted means in reversible direction to reversibly rotate said internally threaded nut and correspondingly move said sleeve in endwise direction.

17. In an indexable collet chuck assembly of the non-rising collet type, an endwise movable sleeve having separate upper and lower portions, a bearing which separates said upper and lower sleeve portions and facilitates controlled rotary movement of said upper sleeve portion on said lower sleeve portion, a collet fitting in said endwise movable sleeve, said upper sleeve portion having an inwardly tapering substantially conical portion at its upper end and said collet having a cooperating portion in contact with said inwardly tapering portion of said upper sleeve portion so that endwise operating movement of said sleeve will actuate said non-rising collet, means for joining said upper sleeve portion to said collet so that their movements relative to each other are limited to said upper sleeve portion moving endwise of said collet, suitably spaced teeth on the outer face of said upper sleeve portion at the upper end thereof, latch means for releasably engaging the teeth on the outer face of said upper sleeve portion for anchoring the latter in various indexed positions, means for disengaging said latch means when said collet is to be indexed, and a latching dog adapted to engage the teeth in said upper sleeve portion and rotate the latter, after said latch has been released, to index said collet in predetermined amount.

18. In an indexable collet chuck assembly as set forth in claim 17; wherein said means for disengaging the latch means includes an indexing ring mounted on the top of said upper sleeve portion and adapted for rotary oscillatory motion thereon, said indexing ring having a cam portion and said latch means having a portion actuatable by said cam portion for disengaging the latching portion of said latch means from the teeth of said upper sleeve portion at the start of movement of said indexing ring from its normal starting position, said latching portion being held in disengaged position by said indexing ring while the latter is moved to the predetermined point of starting the collet indexing and at which point the direction of rotation of the indexing ring is reversed and the latching dog engages the teeth of said upper sleeve portion to rotate the latter, along with said indexing ring, and index said collet, with that indexing, for a single oscillation of the indexing ring, being completed when said indexing ring is returned to its normal starting position where said indexing ring at said cam portion of same releases said latching means to reengage the teeth of said upper sleeve portion and releasably anchor said collet in indexed position.

19. An indexable collet chuck assembly, which comprises a housing, a sleeve mounted in said housing with said sleeve having upper and lower portions, a ball bearing between said upper and lower sleeve portions to facilitate rotation of the upper sleeve portion on the lower sleeve portion, said upper sleeve portion having at its upper end a conical inside surface coaxial with said sleeve and with the large end of said conical surface at the outer end of said sleeve, teeth with predetermined spacing on the outer surface of said upper sleeve portion, a latch assembly mounted on said housing, said latch assembly having a spring projected latch member adapted to tightly engage the space between said teeth for releasably holding said sleeve in various rotatively indexed positions, said latch member having an engageable portion for operating same, an indexing ring mounted on the end of said upper sleeve portion and rotatable thereon coaxially thereof, a handle means projecting from said indexing ring for facilitating the rotation of same, stop means cooperating with said indexing ring for determining the starting point of the indexing movements of same, a latching dog mounted for movement with said indexing ring and adapted to engage the teeth on said upper sleeve portion after said indexing ring has been moved from its stop position to the point of starting indexing and to rotate said upper sleeve portion during the return of said indexing ring to its stop position, said indexing ring having a cam portion at its stop position adapted to engage said engageable portion of said latch to disengage same from said teeth of said upper sleeve portion when said indexing ring is moved from its stop position toward the starting point of indexing, and to return said latch into engagement with the space between said teeth at the end of said indexing operation, said lower sleeve portion having threads on an outer portion of same, a ring nut engaging said threads, said ring nut having teeth on its outer surface, means for rotating said ring nut with said rotating means including a toothed member in engagement with the teeth of said ring nut, means connecting said housing to said lower sleeve portion for limiting the movement of same to endwise direction, a collet fitting within and coaxial with said sleeve and having a cooperating upper portion in engagement with the conical tapered portion of the upper sleeve portion, pin and slot means joining said upper sleeve portion to said collet in manner limiting movement of said upper sleeve portion to lengthwise relative to said collet, and means at the lower end of said collet including a bearing supported on the under portion of said housing for holding said collet against rising, whereby rotation of said ring nut to move said sleeve will actuate said collet, and rotary movement of said indexing ring from its stop position to a predetermined indexing point and return to stop position will index said collet a predetermined amount with said collet supported for rotation between said two bearings.

References Cited in the file of this patent
UNITED STATES PATENTS

| | | |
|---|---|---|
| 1,260,130 | Bemis | Mar. 19, 1918 |
| 2,186,236 | Dearborn | Jan. 9, 1940 |
| 2,335,721 | Zagar | Nov. 30, 1943 |
| 2,429,617 | Gustafson | Oct. 28, 1947 |
| 2,484,758 | Sonnie | Oct. 11, 1949 |
| 2,520,518 | Thompson | Aug. 29, 1950 |
| 2,573,410 | Dearborn | Oct. 30, 1951 |
| 2,621,938 | Ziegler | Dec. 16, 1952 |